(12) United States Patent
Zucchini et al.

(10) Patent No.: US 6,268,947 B1
(45) Date of Patent: Jul. 31, 2001

(54) MIRROR MOUNT FOR A ROTOR AND A METHOD OF PRODUCTION OF A MIRROR ROTOR

(75) Inventors: Maurizio Zucchini, Altedo; Claudio Angelini, Lippo Di Calderara Di Reno, both of (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/657,160

(22) Filed: Sep. 7, 2000

Related U.S. Application Data

(62) Division of application No. 09/207,155, filed on Dec. 8, 1998, now Pat. No. 6,169,620.

(30) Foreign Application Priority Data

Dec. 10, 1997 (EP) .................................................. 97830655

(51) Int. Cl.⁷ .................................................. G02B 26/08
(52) U.S. Cl. ..................... 359/198; 359/855; 359/850; 359/871; 359/900
(58) Field of Search ........................... 359/198, 216–219, 359/871–872, 856, 855, 900

(56) References Cited

U.S. PATENT DOCUMENTS

| 4,277,141 | * | 7/1981 | Kleiber | 359/855 |
| 4,826,271 | | 5/1989 | Takahashi et al. | 359/871 |
| 5,461,505 | | 10/1995 | Nishikawa et al. | 359/21 |
| 5,619,363 | | 4/1997 | Hachisuga | 359/21 |

FOREIGN PATENT DOCUMENTS

| 63-026614 A | 2/1988 | (JP) . |
| 1-287526 A | 11/1989 | (JP) . |
| 2-170112 A | 6/1990 | (JP) . |
| 7-120646 A | 5/1995 | (JP) . |
| 8-036142 A | 2/1996 | (JP) . |

* cited by examiner

Primary Examiner—Darren Schuberg
Assistant Examiner—Fayez Assaf
(74) Attorney, Agent, or Firm—Nixon & Vanderhye P.C.

(57) ABSTRACT

A mirror mount for a rotor provided with a preselected number of external faces suitable for covering with mirrors and an internal structure for connection to an electric motor, in which at least one external face of said mirror mount is provided with projections for supporting a mirror and recesses suitable for holding an adhesive compound for fixing said mirror to said face.

6 Claims, 3 Drawing Sheets

MIRROR MOUNT FOR A ROTOR AND A METHOD OF PRODUCTION OF A MIRROR ROTOR

This is a divisional of application Ser. No. 09/207,155, filed Dec. 8, 1998, now U.S. Pat. No. 6,169,620.

BACKGROUND OF THE INVENTION

1. Field of the Invention

This application is based on the European Patent Application No. 97830655.3, the content of which is incorporated hereinto by reference.

The present invention relates to a mirror mount having faces provided with projections defining a supporting plane, a method of manufacture comprising the mounting of mirrors on said faces and connection of said mirror mount to a suitable electric motor to form a mirror rotor and a mirror rotor obtained by said method.

2. Discussion of Prior Art

Many devices exist which in order to function need to generate, divert and deflect light beams, particularly laser light beams and which perform scanning of surfaces with such light beams, for example, scanners, optical code readers, fax machines, laser printers, medical apparatus, laser type measuring instruments for the construction industry, uneven surface detection instruments, etc.

These devices use mirror rotors for diversion, deflection and/or generation of light beam scanning.

The known mirror rotors comprise a polyhedral mirror mount and an electric motor capable of causing said mirror mount to rotate at preselected speeds. More particularly, the polyhedral mount is provided with a preselected number of absolutely flat external faces on which mirrors capable of guiding the optical beams are mounted and with an internal cylindrical cavity for connecting the mount to the rotor of the electric motor.

Said known polyhedral mounts are made of aluminium and are manufactured by machining the aluminium blank by means of machine tools. The faces defined to receive the mirrors are rendered perfectly smooth and free from burrs and the internal cylindrical cavity for connection to the rotor of the electric motor must have a very accurate diameter in order to prevent movements.

The mirrors are in turn obtained by depositing various numbers of layers (usually from 10 to 20) of a suitable dielectric material, e.g. silicon oxide, titanium oxide, magnesium fluoride, etc., on ordinary glass plates.

Production of the mirror rotor using such a conventional polyhedral mount comprises the following steps:

application of a layer of a two-component adhesive, e.g. UHU PLUS on the rotor of the electric motor, insertion of the motor in the polyhedral mount taking care to slide said rotor of the motor inside the internal cylindrical cavity of the polyhedral mount up to a stop flange, waiting the necessary time (usually from 20 to 30 minutes) for the adhesive to rigidly connect the rotor of the motor to the polyhedral mount, application of the above-mentioned two-component adhesive to the external faces of said polyhedral mount, waiting approximately 15 minutes for the viscosity of said adhesive to increase, placing the mirrors on the external faces of said polyhedral mount, waiting the necessary time (usually from 90 to 150 minutes) for the adhesive to rigidly fix the mirrors to the external faces of said polyhedral mount, startup and running of the mirror rotor thus produced, in order to test alignment of the mirrors with a reference point placed a distance of approximately 500 mm away.

This conventional production method has various disadvantages:

production of the aluminium blank mount made from bar aluminium and subsequent finishing of the same on a machine tool are somewhat laborious and lead to a certain percentage of wastes;

whilst drying, the adhesive is subject to shrinkage and therefore, during the step of fitting the mirrors on the faces of the polyhedral mount, a continuous supervision by an operator is necessary in order to gradually correct the position of the mirrors with a rubber pad and return the same to the correctly aligned position. The operator consequently has to carefully and continuously supervise each rotor throughout the complete drying step of the adhesive, which since it has to take place at ambient temperature, takes several hours (approximately 4). Execution of this step must therefore be entrusted to very expert operators and for a long period of time.

SUMMARY OF THE INVENTION

The object of the present invention is therefore that of obviating the above-mentioned disadvantages and thus substantially reducing the cost of production of mirror rotors. This object is achieved by means of an substantially basket-shaped mount having external faces provided with projections defining a plane of support and which enables simplification of the method of manufacture of a mirror rotor.

Therefore, a first aspect of the invention is constituted by a mirror mount for a rotor provided with a preselected number of external faces suitable for covering with mirrors and an internal structure for connection to an electric motor, characterized in that at least one of the external faces thereof has projections for supporting a mirror and recesses capable of holding an adhesive compound for fixing said mirror to said face.

In accordance with a preferred embodiment, said mirror mount is substantially basket-shaped and its internal structure consists of a cavity the surface of which also comprises projections capable of maintaining said motor axially centred inside said mirror mount and recesses suitable for holding an adhesive fixing compound. Typically, said projections consist of ribs and said recesses consist of grooves extending parallel to the axis of rotation of said mirror mount.

Advantageously, the projections and the recesses of said external face follow a linear course. In such a case, said face presents a succession of alternating ribs and grooves. Typically, said ribs and said grooves are extended parallel to the axis of rotation of said mirror mount. Preferably there are at least two grooves.

In a further preferred embodiment, the external faces of said mirror mount all have the same configuration.

The ratio between the surface area of the recesses and the total surface area of the face may vary within very wide limits given that the existing projections on a face may also comprise only four stems. Preferably said ratio will nevertheless be between 30% and 70% inclusive and, even more preferably, between 40% and 60%.

The number of external faces of the mirror mount, and hence of the mirrors, is not a crucial characteristic of the present invention, since this datum will be determined in the individual case by the skilled in the art according to the performance required of the mirror rotor. This number, however, generally ranges between 6 and 12 inclusive.

Advantageously, the lower base of said mirror mount is provided with an annular flange extending towards the outside and supporting the lower edge of the mirrors. Preferably said annular flange also has a positioning slot. Even more preferably, said mirror mount is provided at the opposite end with a second annular flange extending towards the inside and abutting on the motor.

Advantageously, said recesses of the external face end up in an area which is inclined in relation to the external face and the internal cavity. In addition, said annular flange has holes communicating with the recesses in the internal cavity.

Nor is the material used to make the substantially basket-shaped mirror mount in accordance with the present invention a crucial condition provided said material is stable against changes of temperature and humidity. The skilled in the art will be able to select a suitable metal or polymeric material from a wide range of materials available on the market.

Typically, a composite pressure moulding material consisting of fibreglass or carbon buried in a polymeric matrix may be used. For example, good results have been obtained with a material manufactured by the Lati Company which is marketed as Larton™ G40 and which consists of approximately 40% fibreglass buried in a polymeric matrix of PPS (polyphenylene sulphide) type.

Nor, depending on the preselected material, is the production technique crucial. For example, in the particular case of Larton™ G40, the use of injection moulding by the particular method known as "fan moulding" is preferred.

A second aspect of the invention consists of a method of production of a mirror rotor, characterized in that said method comprises the following steps:
a) placing a mirror in contact with the projections of an external mirror mount face provided with projections and recesses;
b) locking the mirror temporarily in contact with said projections of said face by means of removable holding means;
c) applying an adhesive in the recesses in said external face;
d) allowing the adhesive to harden and
e) removing the removable holding means.

In accordance with one Embodiment, said method also comprises the steps of:
f) inserting an electric motor into an internal cavity in said mirror mount;
g) applying an adhesive in the recesses in said internal cavity, and
h) allowing the adhesive to harden.

In accordance with a further Embodiment, step c) is preceded by the steps of:
b1) inserting a standard type of electric motor into an internal cavity in said mirror mount;
b2) temporarily fixing said mirror mount on said standard electric motor;
b3) running said standard electric motor;
b4) causing a laser beam to be incident upon said mirror;
b5) checking that the laser beam reflected off said mirror is confined within preselected limits of a reference point located a preselected distance away.

In accordance with a further Embodiment, step c) is also preceded by the steps of:

b6) inserting an electric motor into an internal cavity in said mirror mount;
b7) applying an adhesive in the recesses in said internal cavity.

In accordance with a further carrying out, step b7) is also preceded by the steps of:
b61) temporarily fixing said mirror mount on said electric motor;
b62) running said electric motor;
b63) causing a laser beam to be incident upon said mirror;
b64) checking that the laser beam reflected off said mirror is confined within preselected limits of a reference point located a preselected distance away;
b65) if the checking gives a negative result, rotating said mirror mount a certain amount in relation to said motor and repeating steps from b61) to b64), only going on to step b7) if the check gives a positive result.

Advantageously, said steps b2) and b62) are carried out by means of mechanical interference between said motor and said ribs presented by said internal cavity of said mirror mount.

These checks and in particular the possibility of checking the correct position of each mirror on the respective face before applying the adhesive represent one of the many advantages of the present invention in comparison with the prior art.

A third aspect of the present invention consists of a mirror rotor comprising a mount provided with a preselected number of external faces covered by mirrors and an internal cavity rigidly connected to an electric motor, characterized in that at least one external face of said mount is provided with supporting projections for a mirror and recesses containing an adhesive compound for fixing said mirror to said face.

BRIEF DESCRIPTION OF THE DRAWINGS

Features and advantages of the invention will now be illustrated with reference to an embodiment represented as a non limiting example in the appended figures, in which.

DETAILED DISCUSSION OF PREFERRED EMBODIMENTS

Figure 1:
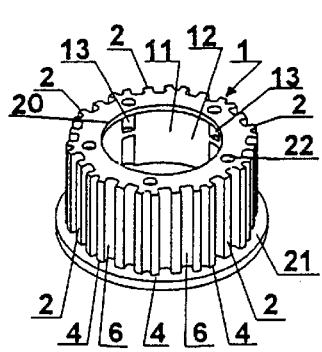
FIG. 1 is a perspective top view of a mirror mount, substantially basket-shaped, for a rotor of an optical code laser reader embodied in accordance with the invention.
Figure 2:
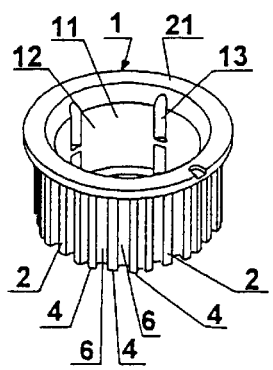
FIG. 2 is a perspective bottom view of the mirror mount of FIG. 1.
Figure 3:
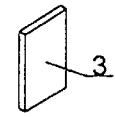
FIG. 3 is a perspective view of a mirror for the mirror mount of FIG. 1.
Figure 14:
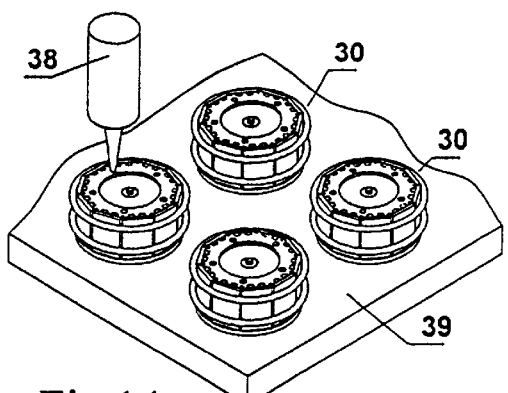

FIGS. 1, 2, 5–8 show a mirror mount 1, substantially basket-shaped, for a mirror rotor 30 (FIG. 14). The mirror mount 1 is used to support mirrors 3 (FIG. 3) and has ten rectangular shaped external faces 2. The mirrors 3 are fitted on the faces 2 by a method which is illustrated further below.

Figure 5:
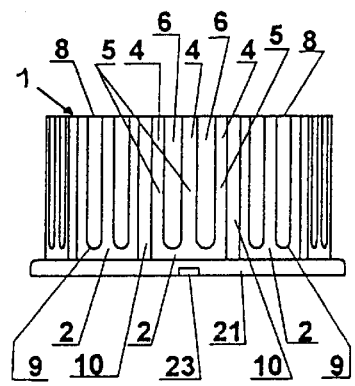
FIGS. 5, 6 and 7 are, respectively, a front view, a top view and a bottom view of a mirror mount of FIG. 1.
Figure 6:
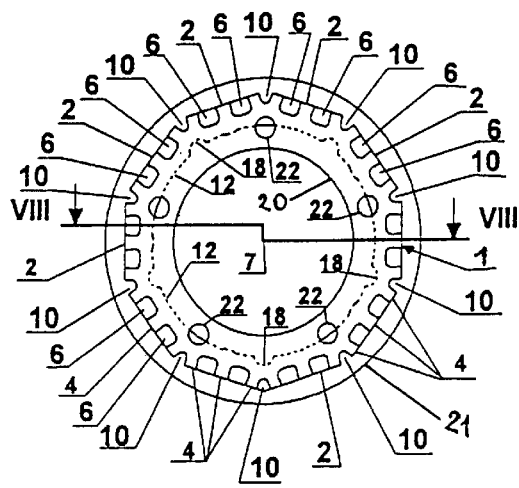
Figure 7:
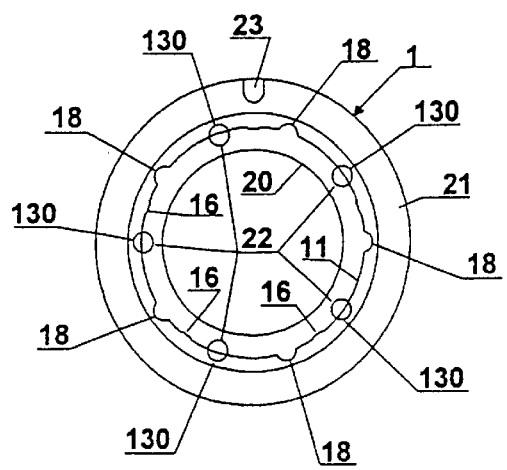

Each face 2 is formed by three ribs 4 and two grooves 6. The ribs 4 have flat surfaces 5 suitable for direct contact with a mirror 3 and the grooves 6 are capable of holding an adhesive for fixing each mirror 3 to the respective face 2. Each groove 6 has an open end 8 for injection of the adhesive and an opposite, closed end 9 to prevent escape of the adhesive (FIG. 5). The grooves 6 are parallel to the rotation axis 7 of the mirror mount 1 and are lower in height than the height of the face 2. Consecutive faces 2 are separated by a groove 10, which is also parallel to the axis of rotation 7.

Figure 4:
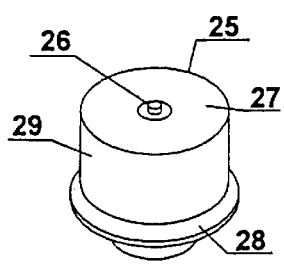
FIG. 4 is a perspective view of an electric motor for the mirror mount of FIG. 1.
Figure 8:
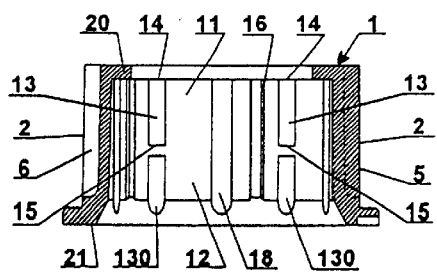
FIG. 8 is a cross-sectional view across the plane VIII—VIII of FIG. 6.

The mirror mount 1, substantially basket-shaped, is provided with an internal cavity 11 substantially cylindrical in shape, the surface of which has solid sectors 12 and grooves 13. The sectors 12 demarcate an essential part of the substantially cylindrical cavity 11 suitable for receiving a rotor 27 of an electric motor 25 (FIG. 4). The grooves 13 are capable of holding an adhesive for fixing the mirror mount 1 to the rotor 27 of the electric motor 25. The grooves 13 are parallel to the axis of rotation 7 and have an open end 14 for injection of an adhesive and a closed opposite end 15 for prevention of escape of adhesive (FIG. 8). Projecting from the sectors 12 are ribs 16 for centring the mirror mount 1 in relation to the electric motor 25. The mirror mount 1 is also provided with lightening grooves 130 and 18; the first of these are aligned with the grooves 13 and the second separate consecutive sectors 12 and are parallel to the rotation axis 7.

The mirror mount 1, substantially basket-shaped, is provided, at one end, with an annular flange 20 extending towards the inside and, at the opposite end, with a flange 21 extending towards the outside. The flange 20 is provided with holes 22 coaxial to the grooves 13 and the flange 21 is provided with a reference notch, or slot, 23.

The electric motor 25 comprises the rotor 27 provided with a flange 28 and a stator 26 (FIG. 4). The stator 26 is formed by a fixed shaft carrying an inductor winding; the rotor 27 is rotatably mounted on the fixed shaft 26 and carries an armature winding. The rotor 27 is demarcated by an external cylindrical wall 29 for connection to the cylindrical cavity 11 of the mirror mount 1. The diameter of the cylindrical body of the rotor 27 and the diameter of the cylindrical cavity 11 are such that connection with strict tolerance is ensured.

On each face 2 of the mirror mount 1 the grooves 6 extend for a partial area which may range of from 30% to 70% of the total area of the face 2. Preferably, the cavity/total surface ratio ranges of from 40% to 60%. The optimum ratio is approximately 50%. This ratio, i.e. the ratio between the surface of the mirror in contact with the adhesive and the surface of the mirror resting on the structure of the mirror mount is preselected in such a way as to ensure, on the one hand, perfect positioning and alignment of the mirrors and on the other hand, good "setting" of the adhesive so that the mirror stays fixed in its position as well at the maximum estimated rotation speed of the rotor 27.

The grooves 130 of the internal cavity 11 also need not be present, since they do not contain adhesive.

The grooves 18 and 130 perform different functions:
they lighten the mirror mount;
balance the mirror mount;
maintain the distribution of the material in the volume of the mirror mount as constant as possible, so that as a result the mirror mount has constant density and formation of "clots" of material which would lead to misalignment of the faces and dangerous stress peaks is prevented in the cooling-down step of the injected material.

FIGS. 9–14 illustrate a method of production of a mirror rotor 30 in accordance with the invention.

Figure 9:
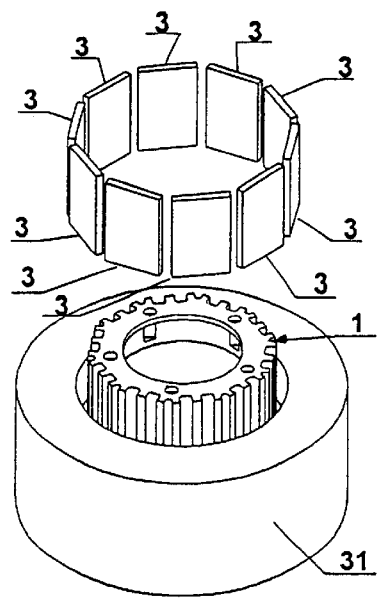
FIGS. 9–14 show different steps of a method of production of a mirror rotor in accordance with the invention.
Figure 10:
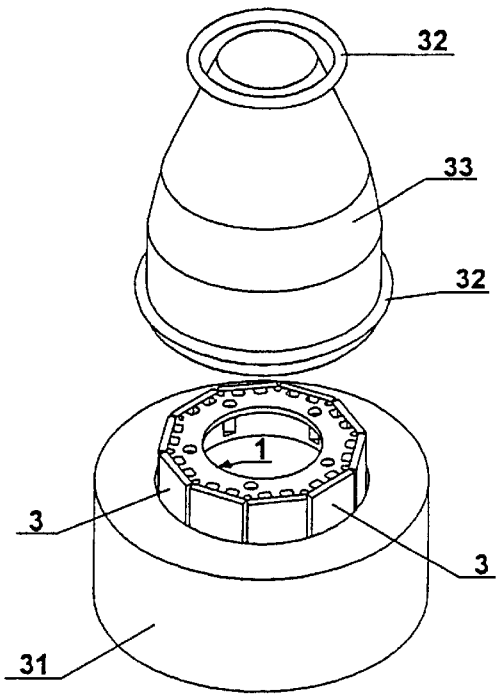

The mirrors 3 are first of all placed on the faces 2 of the substantially basket-shaped mirror mount 1. For this purpose a support base 31 can advantageously be used (FIG. 9). Two O-rings 32 are then applied, inserted from the top by means of a funnel-shaped insertion tool 33 (Fig.10), in order to keep the mirrors 3 in place on the faces 2.

In this step it is possible to check, again before applying the adhesive, that the position of the mirrors is correct. For this purpose, the mirror mount is inserted onto the rotor of a "standard" electric motor mounted on an alignment bar 34 (FIG. 12) and the electric motor is switched on, thus causing the rotor to rotate. A laser beam is sent onto the mirrors of the rotor by means of laser source 36 and the displacement 37 of the laser beam reflected off the mirrors 3 on plane 35 placed in front of the rotor and at a given distance from it, is checked. In particular, it is possible to check the inclination of the mirrors so that if they are not perfectly flat and vertical, some of the material of the faces can be removed or imperfections corrected or the mirror mount can even be discarded.

Figure 11:
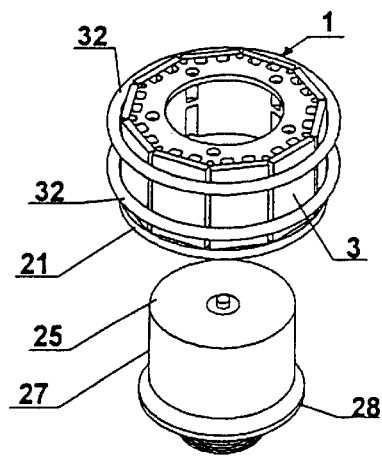
Figure 12:
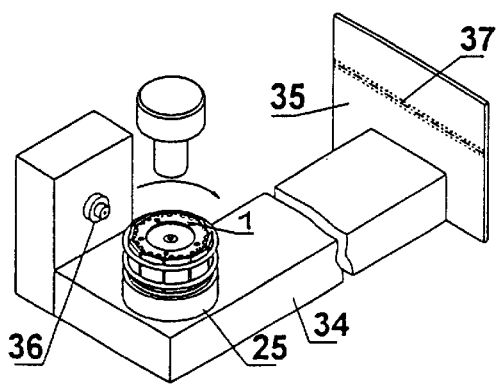
Figure 13:
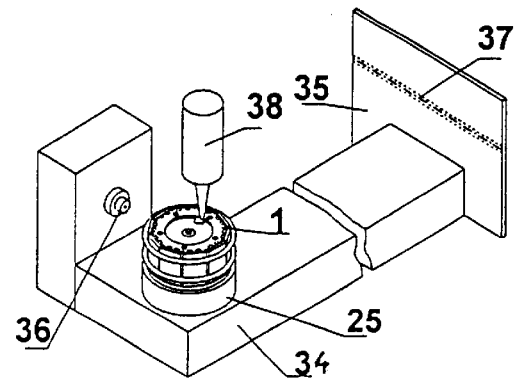

The subassembly formed by the mirror mount 1 provided with the mirrors 3 is then fitted on the rotor 27 of the electric motor 25 (FIG. 11). The correct axial position of the mirror mount 1 is ensured by the ribs 16. Temporary fixing of the mirror mount 1 to the motor 27 is not necessary since the internal ribs 16 of the mirror mount slightly interfere with the external wall 29 of the rotor of the motor, thus creating a shrunk connection. The assembly formed by the mirror mount 1 provided with mirrors 3 and the motor 25 is then mounted on the alignment bar 34 (FIG. 12), where the motor 25 is fed by means of needle contacts, and run at working speed, which is approximately 3000 r/min. A laser beam outgoing from a source 36 and leaving mirrors 3 carried by the mirror mount 1 generates scanning lines 37 on a reference point 35 placed a distance of approximately 500 mm away. In this way it is checked that the laser beam is "confined" within the established tolerances (for example, that it has a maximum thickness of 3 mm).

If the beam is not confined within the preselected tolerances, the mirror mount 1 is rotated in relation to rotor 27, which is held firm by means of a magnet, so as to find the optimum position which minimises dispersion of the beam. This operation enables correct balancing of the assembly consisting of the mirror mount 1 provided with the mirrors 3 and the motor 25 because it enables adjustment of the motor fitting errors (fitting of bearings and shaft), which are always present even if minimal and errors due to manufacturing tolerances of the mirror mount, thus reducing to a minimum or even cancelling out their negative effects which, on the contrary, could sum up if this operation were not carried out.

Having found the correct position, the mirror mount 1 is locked onto the rotor 27 by means of a drop of adhesive injected between the flanges 20 and the rotor 27 (FIG. 13) using a metering gun 38. Preferably, the adhesive is of two-component type and has a drying time of a few minutes, e.g. Saldarapido Mixer™ by Bostik.

Following this, in order to achieve complete adhesion of all the components, the assembly formed by the mirror mount 1 provided with the mirrors 3 and the motor 25 is placed on a tray 39 in which references are present which match to the notch 23 in the flange 21 of the mirror mount (FIG. 14). After which, by means of the gun 38, adhesive is injected into the grooves 6 behind the mirrors 3 in order to fix said mirrors rigidly to the mirror mount 1. The adhesive is then injected through the holes 22 in the flange 20 into the grooves 13 of the internal cavity so as to rigidly fix the mirror mount 1 to the rotor 27 of the electric motor 25. The grooves 6 and 13 can also be simultaneously filled by means of the gun 38.

The gun 38 is automatically moved by an automated arm, not shown.

The preferred adhesive in this step is Araldite™ 2019 by CIBA GEIGY. This is a two component adhesive having optimum technical characteristics (tensile strength 10 N/mm$^2$, temperature range during use from −20 to +100° C.) and is sufficiently liquid for easy metering by a gun.

The adhesive is then left to dry at ambient temperature for approximately 22 hours. Finally, the two O-rings 32 holding the mirrors 3 are removed and the latter are cleaned. The mirror rotor 30 is then ready for fitting in an optical device.

What is claimed is:

1. A production method for a mirror rotor comprising a mirror mount characterized in that it comprises the following steps:

a) placing a mirror in contact with the projections of an external face of a mirror mount provided with projections and recesses;

b) temporarily locking said mirror in contact with said projections of said face using removable holding means;

c) applicating an adhesive in the recesses in said external face;

d) leaving the adhesive to harden, and e) removing the removable holding means.

2. A method according to the preceding claim 1, characterized in that said method also comprises the steps of:

f) inserting an electric motor into an internal cavity in said mirror mount;

g) applying an adhesive in the recesses in said internal cavity, and h) leaving the adhesive to harden.

3. A method according to the preceding claim 1, characterized in that step c) is preceded by the steps of:

b1) inserting a standard electric motor in an internal cavity in said mirror mount;

b2) temporarily fixing said mirror mount onto said standard electric motor;

b3) running the standard electric motor;

b4) causing a laser beam to be incident upon said mirror;

b5) checking that the laser beam reflected off said mirror is confined within preselected limits of a reference point located a preselected distance away.

4. A method according to claim 1, characterized in that step c) comprises the steps of:

b6) inserting an electric motor into an internal cavity in said mirror mount;

b7) applying an adhesive in the recesses in said internal cavity.

5. A method according to the preceding claim 4, characterized in that step b7) is preceded by the steps of:

b61) temporarily fixing said mirror mount onto said electric motor;

b62) running said electric motor;

b63) causing a laser beam to be incident upon said mirror;

b64) checking that the laser beam reflected off said mirror is confined within preselected limits of a reference point placed a preselected distance away;

b65) if the checking result is negative, rotating said mirror mount by a certain quantity in relation to said motor and repeating steps from b61 to b64) and only going on to step b67) if the checking result is positive.

6. A method according to claim 3 characterized in that said steps b2) and b61) are carried out by means of mechanical interference between said motor and said ribs presented by said internal cavity of said mirror mount.

* * * * *